United States Patent
Niederdränk

(10) Patent No.: US 7,433,480 B2
(45) Date of Patent: Oct. 7, 2008

(54) HEARING AID WITH WIRELESS TRANSMISSION SYSTEM, AND OPERATING METHOD THEREFOR

(75) Inventor: Torsten Niederdränk, Erlangen (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 640 days.

(21) Appl. No.: 11/001,966

(22) Filed: Dec. 1, 2004

(65) Prior Publication Data

US 2005/0135645 A1 Jun. 23, 2005

(30) Foreign Application Priority Data

Dec. 1, 2003 (DE) ................. 103 56 092

(51) Int. Cl.
*H04R 25/00* (2006.01)
(52) U.S. Cl. ........................ 381/312; 381/331
(58) Field of Classification Search ................. 381/312, 381/314, 315, 320, 321, 92, 122, 331; 379/443
See application file for complete search history.

(56) References Cited

U.S. PATENT DOCUMENTS

| 4,845,755 | A | | 7/1989 | Busch et al. |
|---|---|---|---|---|
| 4,920,570 | A | | 4/1990 | West et al. |
| 5,012,520 | A | | 4/1991 | Steeger |
| 5,210,803 | A | * | 5/1993 | Martin et al. ............... 381/315 |
| 5,680,466 | A | | 10/1997 | Zelikovitz |
| 6,157,727 | A | * | 12/2000 | Rueda ........................ 381/312 |
| 6,760,457 | B1 | * | 7/2004 | Bren et al. ................... 381/331 |
| 6,763,116 | B2 | * | 7/2004 | Barthel et al. ............... 381/312 |
| 2003/0045283 | A1 | | 3/2003 | Hagedoorn |
| 2003/0223592 | A1 | * | 12/2003 | Deruginsky et al. ........... 381/92 |
| 2004/0013280 | A1 | | 1/2004 | Niederdrank |

FOREIGN PATENT DOCUMENTS

| EP | 0 176 116 | 3/1992 |
|---|---|---|
| EP | 0 823 829 | 2/1998 |
| GB | 1 565 701 | 4/1980 |
| WO | WO 95/01678 | 1/1995 |

* cited by examiner

*Primary Examiner*—Huyen D Le
(74) *Attorney, Agent, or Firm*—Schiff Hardin LLP

(57) ABSTRACT

To allow bidirectional data communication to be realized in hearing aids which have only a restricted installation space, the earphone, i.e. the electroacoustic transducer unit, is used as the transmitter and the telephone coil as the receiver for high-frequency signal components. This makes it possible to dispense with the installation of an additional antenna, generally of a large volume, that is optimized for transmitting and receiving operations. If appropriate, a small additional antenna may also be used purely as a receiving antenna for high-frequency signals.

14 Claims, 1 Drawing Sheet

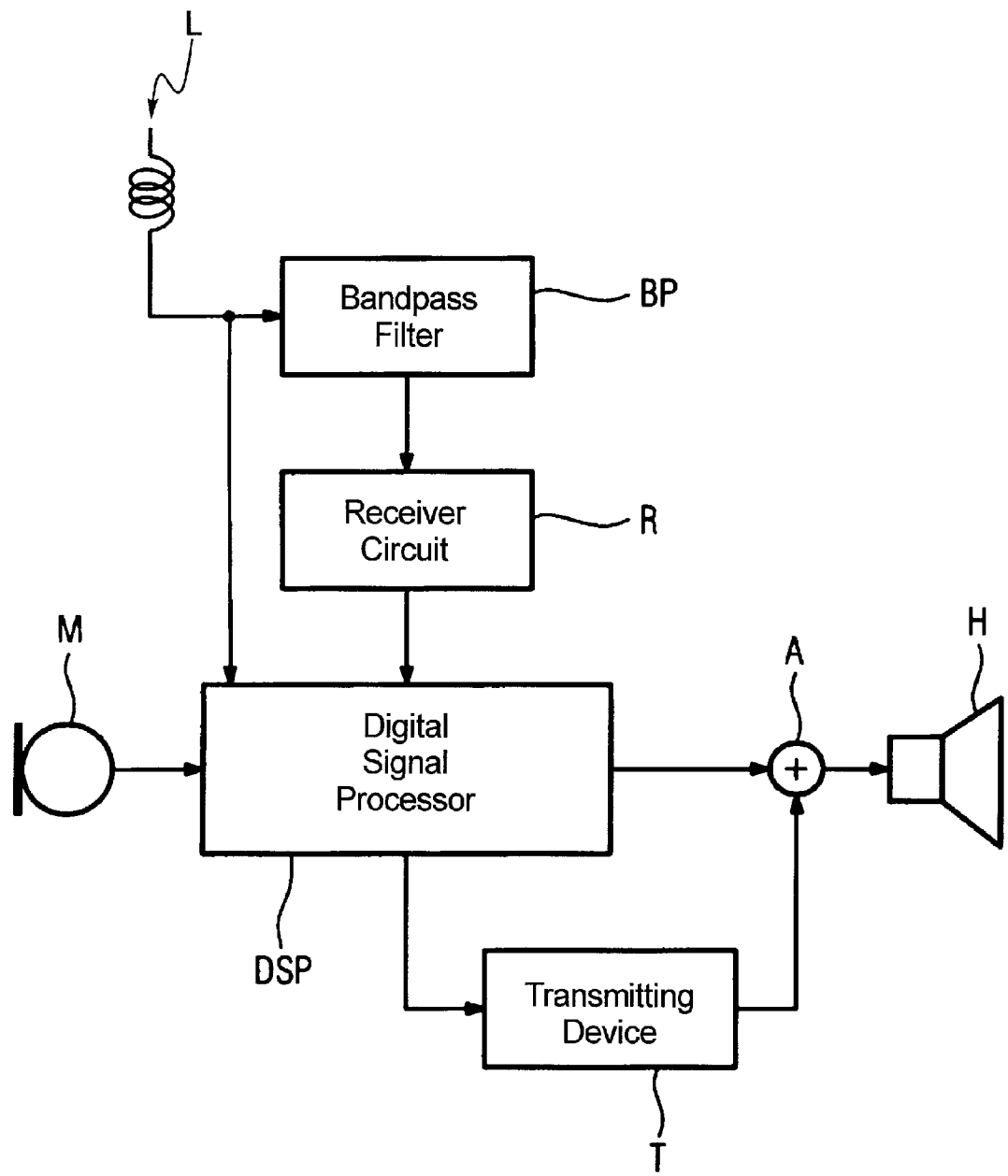

HEARING AID WITH WIRELESS TRANSMISSION SYSTEM, AND OPERATING METHOD THEREFOR

BACKGROUND OF THE INVENTION

1. Field of the Invention

The present invention relates to a hearing aid of the type having a transmission device, which permits data transmission in a spectral range above the audible range between the hearing aid and an external device, and an electroacoustic transducer device for generating sound signals from electric signals and/or a telephone coil device for receiving an electromagnetic signal. In addition, the present invention relates to a method for operating such a hearing aid.

2. Description of the Prior Art

In the field of hearing aids, there are numerous applications for wireless transmission systems. Examples of these are wireless programming, the use of a remote control, as well as reception of audio data from external sources. In practice, however, the integration of such a system into a hearing aid proves to be very difficult due to the stringent conditions with respect to space requirements and energy consumption, so that there are only very few instances in which the use of wireless transmission systems has been technically realized. In addition, applications such as the programming require a bidirectional wireless connection, the implementation of which involves even greater technical problems.

Although remote-control systems that are currently available transmit data into the hearing aid, the reverse process is not possible. Usually inductive transmission systems are used for this purpose.

German OS 100 48 354 describes a bidirectional connection between hearing aids or between a hearing aid and a remote control. A separate antenna, which has to be accommodated in the hearing aid, is necessary for this bidirectional connection. Since it has a corresponding space requirement, universal use of bidirectional data transmission systems in hearing aids is prevented.

German OS 34 31 584 and the document European Application 0 176 116 respectively describe hearing aids with ultrasound control. For controlling the hearing aid, in this case an ultrasound signal is picked up by the microphone of the hearing aid and processed separately after suitable filtering.

SUMMARY OF THE INVENTION

An object of the present invention is to provide a hearing aid and method which, while occupying a small amount of space, permit bidirectional data transmission with an external device.

According to the invention, this object is achieved by a hearing aid with a transmission device, which permits data transmission in a spectral range above the audible frequency range between the hearing aid and an external device, and an electroacoustic transducer device for generating sound signals from electric signals, the electroacoustic transducer device being used as the receiving and/or transmitting device for receiving or transmitting electromagnetic signals in the spectral range above the audible frequency range to the external device and/or from it.

The above object also is achieved by a hearing aid with a transmission device, which permits a data transmission in a spectral range above the audible frequency range between the hearing aid and an external device, and a telephone coil device, which is used as the transmitting and/or receiving element of the transmission device for transmitting and/or receiving electromagnetic signals of which the spectral components lie above the audible frequency range to the external device or from it.

An advantage of the inventive hearing aid and method is that the wireless transmission of data from and to a hearing aid does not require special, bulky antennas to be integrated into the hearing aid. Rather, existing components are used for the data transmission.

A hearing aid of which the electroacoustic transducer device is used for transmitting electromagnetic signals above the audible frequency range or audio frequency range has a telephone coil device for receiving electromagnetic signals above the audio frequency range. Under some circumstances, however, it may also be advantageous to use the telephone coil device for transmitting and the electroacoustic transducer device for receiving the radio-frequency signals. In this way, a component that is already present in the hearing aid is used both when transmitting and when receiving the radio-frequency signals, so that no additional installation space for a special antenna is necessary.

The electroacoustic transducer device or the telephone coil device may be integrated in a resonant circuit for transmitting in a predetermined frequency band. As a result, relatively simple activation of the transmission components can be achieved.

Furthermore, the coil of the telephone coil device may have a ferrite core. As a result, the telephone coil device is better suited for the transmission of radio-frequency signals.

For special applications, it may be expedient for the telephone coil device in the hearing aid to be used for receiving electromagnetic signals in the audio frequency range and for further coil device to be used for receiving electromagnetic signals above the audio frequency range. This has the advantage that the further coil device can be optimized for the radio-frequency transmission and can be made smaller.

DESCRIPTION OF THE DRAWINGS

The FIGURE is a block diagram of a hearing aid constructed and operating in according to the invention.

DESCRIPTION OF THE PREFERRED EMBODIMENTS

The exemplary embodiment described in more detail below represents a preferred embodiment of the present invention.

In hearing aids, the known earphones are usually used as electroacoustic transducers. Because of their electromagnetic operation, they emit a considerable stray electromagnetic field. This stray field, which, depending on the type of electrical excitation of the earphone, can sometimes extend over a wide bandwidth into the range of several megahertz, represents a constant source of interference, and must be taken into account in the development of the hearing aid. The invention is based on the use of this "interfering" stray field constructively for the transmission of data from the hearing aid.

In the hearing aid represented in the FIGURE as a block diagram, the electroacoustic transducer being used for transmitting radio-frequency signals. In general, the hearing aid has a microphone M, a digital signal processor DSP and an earphone H as an electroacoustic transducer. In the present example, the output signal of the digital signal processor DSP, and consequently the magnetic circuit of the earphone H, is subjected to a modulated, high-frequency transmission signal. Integrated in the hearing aid for this purpose is a transmitting device T, which modulates and encodes a data signal of the digital signal processor DSP for the wireless transmission. The output signal of the transmission unit T is added in an adder A to the output signal of the digital signal processor DSP. The electromagnetic fields generated by the high-frequency signal components can be received outside the hearing aid. For example, the transmission could take place to headphones being worn by a patient in a hearing test.

For receiving an electromagnetic radio-frequency signal transmitted from an external source, the telephone coil L that is present in any case in most hearing aids can be used according to the invention. This telephone coil L is usually used to transmit electromagnetic signals in the audio frequency range to the digital signal processor DSP of the hearing aid. At the same time, the signals received in the telephone coil L are passed to a bandpass filter BP, which filters out spectral components of the signal above the audio frequency range. The filtered-out high-frequency components are passed on to a receiver circuit R. This extracts the corresponding data from the signals received and transmits them to the digital signal processor DSP of the hearing aid, in order for example to change the setting of the latter.

The telephone coil usually is optimized as an antenna for the reception of signals in the audio frequency range. To adapt it also for the additional purpose of reception of high-frequency signals, it can be electrically wired in a suitable manner (not shown in the FIGURE) and if need be ran be provided with a ferrite core. In this way it is possible to integrate a bidirectional transmission system into the hearing aid without the need for large components to be additionally introduced into the housing of the hearing aid.

For the bidirectional communication, it may not be necessary to provide a special antenna in addition to the electroacoustic transducer H as the transmitter and the telephone coil L as the receiver. If as already indicated—the telephone coil L is not to be used also as a receiving antenna for high-frequency signal components, a small receiving antenna that is optimized for high-frequency reception may be additionally incorporated in the hearing aid.

Although modifications and changes may be suggested by those skilled in the art, it is the intention of the inventor to embody within the patent warranted hereon all changes and modifications as reasonably and properly come within the scope of his contribution to the art.

I claim as my invention:

1. A hearing aid comprising:
    a hearing aid housing;
    an input element in said hearing aid housing for receiving incoming acoustic signals and generating electrical signals therefrom;
    a signal-processing circuit in said hearing aid housing, connected to said input element, for processing said electrical signals to produce processed signals therefrom;
    an electroacoustic transducer in said hearing aid housing, supplied with said processed signals, for converting said processed signals into acoustic signals; and
    a circuit in said hearing aid housing connected to said electroacoustic transducer configured to operate said electroacoustic transducer as at least one of a receiver for receiving electromagnetic signals in a spectral range above the audible frequency range from an external device remote from said hearing aid housing, or as a transmitting device for transmitting electromagnetic signals in said spectral range to said external device.

2. A hearing aid as claimed in claim 1 wherein said circuit comprises a resonant circuit, that includes said electroacoustic transducer, for transmitting said electromagnetic signals in a predetermined frequency band.

3. A hearing aid comprising:
    a hearing aid housing;
    an acoustoelectric transducer in said hearing aid housing for receiving an incoming acoustic signal and converting said incoming acoustic signal into an electrical signal;
    a telephone coil in said hearing aid housing for receiving audio signals from a telephone speaker and converting said audio signals into an electrical signal;
    a signal-processing circuit in said hearing aid housing, connected to said acoustoelectric transducer and to said telephone coil for processing one of said electrical signal from acoustoelectrical transducer and said electrical signal from said telephone coil to produce a processed signal;
    an electroacoustic transducer in said hearing aid housing, connected to said signal-processing circuit, for converting said processed signal into an acoustic signal;
    a first operating circuit in said hearing aid housing connected to said telephone coil configured to operate said telephone coil as a receiver for electromagnetic signals, in a spectral range above the audible frequency range, from an external device located remote from said hearing aid housing; and
    a second operating circuit in said hearing aid housing connected to said electroacoustic transducer configured to operate said electroacoustic transducer as a transmitter for transmitting electromagnetic signals in said spectral range to said external device.

4. A hearing aid as claimed in claim 3 wherein said second operating circuit comprises a resonant circuit, including said electroacoustic transducer, for transmitting said electromagnetic signals in a predetermined frequency band.

5. A hearing aid as claimed in claim 3 wherein said telephone coil comprises a coil having a ferrite core.

6. A hearing aid comprising:
    a hearing aid housing;
    an acoustoelectric transducer in said hearing aid housing for receiving incoming acoustic signals and converting said incoming acoustic signals into an electrical signal;
    a telephone coil in said hearing aid housing for receiving acoustic signals from a telephone speaker and for converting said acoustic signals into an electrical signal;
    a signal-processing circuit in said hearing aid housing, connected to said acoustoelectric transducer and to said telephone coil, for processing one of said electrical signal from said electroacoustic transducer and said electrical signal from said telephone coil to produce a processed signal;
    an electroacoustic transducer in said hearing aid housing, connected to said signal-processing circuit, and supplied with said processed signal for converting said processed signal into an acoustic signal; and
    a circuit in said hearing aid housing connected to said telephone coil configured to selectively operate said telephone coil as a transmitter for transmitting an electromagnetic signal in a spectral range above the audible frequency range to an external device disposed remote from said hearing aid housing, or as a receiver for receiving an electromagnetic signal in said spectral range from said external device.

7. A hearing aid as claimed in claim 6 wherein said telephone coil comprises a coil having a ferrite core.

8. A method for operating a hearing aid comprising the steps of:

receiving incoming acoustic signals with an input element in a hearing aid housing and generating electrical signals therefrom;

for processing said electrical signals in a signal-processing circuit in said hearing aid housing connected to said input element to produce processed signals therefrom;

supplying said processed signals to an electroacoustic transducer in said hearing aid housing and converting said processed signals into acoustic signals; and operating said electroacoustic transducer, with a circuit in said hearing aid housing connected to said electroacoustic transducer as at least one of a receiver for receiving electromagnetic signals in a spectral range above the audible frequency range from an external device remote from said hearing aid housing, or as a transmitting device for transmitting electromagnetic signals in said spectral range to said external device.

9. A method for operating a hearing aid as claimed in claim 8 comprising employing a resonant circuit, which includes said electroacoustic transducer, as said circuit for operating said electroacoustic transducer for transmitting said electromagnetic signals in a predetermined frequency band.

10. A method for operating a hearing aid comprising the steps of:

optionally receiving an incoming acoustic signal with an acoustoelectric transducer in a hearing aid housing and converting said incoming acoustic signal into an electrical signal or receiving audio signals from a telephone speaker with a telephone coil in said hearing aid housing and converting said audio signals into an electrical signal;

processing one of said electrical signal from acoustoelectrical transducer and said electrical signal from said telephone coil with a signal-processing circuit in said hearing aid housing, connected to said acoustoelectric transducer and to said telephone coil to produce a processed signal;

converting said processed signal into an acoustic signal in an electroacoustic transducer in said hearing aid housing connected to said signal-processing circuit;

operating said telephone coil with a first operating circuit in said hearing aid housing connected to said telephone coil as a receiver for electromagnetic signals, in a spectral range above the audible frequency range, from an external device located remote from said hearing aid housing; and operating said electroacoustic transducer with a second operating circuit in said hearing aid housing connected to said electroacoustic transducer as a transmitter for transmitting electromagnetic signals in said spectral range to said external device.

11. A method for operating a hearing aid as claimed in claim 10 comprising employing a resonant circuit, including said electroacoustic transducer, at said second operating circuit for operating said electroacoustic transducer for transmitting said electromagnetic signals in a predetermined frequency band.

12. A method for operating a hearing aid as claimed in claim 10 comprising employing a coil having a ferrite core as said telephone coil.

13. A method for operating a hearing aid comprising the steps of:

receiving incoming acoustic signals with an acoustoelectric transducer in said housing and converting said incoming acoustic signals into an electrical signal, or receiving acoustic signals from a telephone speaker with an acoustoelectric transducer in said housing and converting said acoustic signals into an electrical signal;

for processing one of said electrical signal from said electroacoustic transducer and said electrical signal from said telephone coil with a signal-processing circuit in said hearing aid housing, connected to said acoustoelectric transducer and to said telephone coil to produce a processed signal;

supplying said processed signal to an electroacoustic transducer in said hearing aid housing, connected to said signal-processing circuit, and converting said processed signal into an acoustic signal; and selectively operating said telephone coil, with a circuit connected in said hearing aid housing to said telephone coil as a transmitter for transmitting an electromagnetic signal in a spectral range above the audible frequency range to an external device disposed remote from said hearing aid housing, or as a receiver for receiving an electromagnetic signal in said spectral range from said external device.

14. A method for operating a hearing aid as claimed in claim 13 comprising employing a coil having a ferrite core as said telephone coil.

* * * * *